United States Patent [19]
Kubo

[11] 3,710,649
[45] Jan. 16, 1973

[54] HYDRAULIC CONTROL DEVICE FOR AUTOMATIC TRANSMISSION

[75] Inventor: Seitoku Kubo, Toyota, Japan

[73] Assignee: Toyota Jidosha Kogyo Kabushiki Kaisha, Toyota-shi, Japan

[22] Filed: Feb. 2, 1971

[21] Appl. No.: 111,978

[30] Foreign Application Priority Data

Feb. 3, 1970    Japan..................................45/9479

[52] U.S. Cl......................74/753, 74/752 A, 74/869
[51] Int. Cl..........F16h 3/44, F16h 5/42, B60k 21/00
[58] Field of Search......................74/753, 863–865, 74/867–869, 752 A

[56] References Cited

UNITED STATES PATENTS

| | | | |
|---|---|---|---|
| 2,995,957 | 8/1961 | Wilson et al.......................... | 74/752 A |
| 3,495,481 | 2/1970 | Ohie et al.............................. | 74/864 |
| 3,543,610 | 12/1970 | Kogaki.................................. | 74/867 |

Primary Examiner—Arthur T. McKeon
Attorney—Cushman, Darby & Cushman

[57] ABSTRACT

A hydraulic pressure control device is provided for an automatic transmission including a hydraulic torque-converter or fluid coupling, a change speed gearing, a hydraulic servo for brake bands, clutches and the like. A relay valve is added to a pressure regulator valve for controlling the hydraulic pressure applied to the servo, and in response to the actuation of an automatic shift valve an oil line to the servo is communicated with a pressure control chamber in the pressure regulator valve so that the pressure regulating function of the pressure regulator valve may be varied depending upon the position of a manual valve and also depending upon the actuation of the automatic shift valve. The hydraulic circuit may be simplified.

2 Claims, 9 Drawing Figures

INVENTOR

Saitoku KUBO

ATTORNEYS

HYDRAULIC CONTROL DEVICE FOR AUTOMATIC TRANSMISSION

BACKGROUND OF THE INVENTION

The present invention relates to a hydraulic control device for an automatic transmission employing a fluid coupling or torque-converter, and more particularly a hydraulic pressure control device for controlling the hydraulic pressure (to be referred to as "line pressure" hereinafter) to be supplied to the hydraulic servos for clutches, brake bands and the like.

SUMMARY OF THE INVENTION

One of the objects of the present invention is to add a relay valve to a pressure regulator valve for controlling the line pressure PL in such a way that the relay valve may be actuated in different manner in response to the position of a manual valve so as to change the control or regulating function of the pressure regulator valve thereby producing the line pressure having different magnitudes or levels in response to the position of the manual valve.

Another object of the present invention is to communicate a line pressure conduit or line through which the line pressure is transmitted to the servos by an automatic shift valve, with a control chamber in the pressure regulator valve, thereby changing the pressure control or regulating function of the pressure regulator valve depending upon the presence or absence of the line pressure in said control or regulation chamber in response to the activation or deactivation of the automatic shift valve.

To accomplish the above and other objects of the present invention, in the D or drive range the hydraulic pressure from an oil pump is directly supplied into the oil pressure chamber in the pressure adjustment valve so as to oppose the force of a spring loaded at one end of the valve spool of the pressure regulator valve. In the II or second range and L or low range the hydraulic pressure from the oil pump is slightly reduced by the relay valve. Thus the function of the pressure regulator valve in the D range is varied from that in the II or L range so that the line pressure PL in the II or L range may be higher than the line pressure PL in the D range.

More specifically, a spring is loaded at one end of the valve spool of the relay valve and in the D range of the manual valve the hydraulic pressure in a conduit or line selected by the manual valve is directly transmitted to the chamber of the pressure regulator valve without being modified under the force of the spring. In the II and L range, the hydraulic pressure from the oil pump is reduced by a degree corresponding to the force of the spring before it is transmitted into the oil pressure chamber in the pressure regulator valve.

Another oil pressure chamber is formed in the pressure regulator valve so that the hydraulic pressure applied to this oil pressure chamber depending upon the actuation of the automatic shift valve may oppose the force of a spring loaded at one end of the valve spool of the pressure regulator valve. For example in case of a 1-2 shift valve, the hydraulic pressure or oil under pressure is transmitted into the oil pressure chamber when the shift through speeds from the first to the second takes place, thereby stepping down the high line pressure to the low line pressure.

According to one aspect of the present invention, a hydraulic pressure control device for use in an automatic transmission including a fluid torque-converter or fluid coupling and a transmission provided with a hydraulic servo for brake bands, clutches and the like, comprises an oil pump for generating the hydraulic pressure to be applied to said hydraulic servo; a pressure regulator valve for controlling the hydraulic pressure to be applied to the hydraulic servo, the pressure regulator valve having an oil pressure chamber formed therein for controlling said hydraulic pressure, a manual valve having at least two positions, a relay valve adapted to supply a required hydraulic pressure to the oil pressure chamber in the pressure regulator valve, a first conduit for communicating the oil pump with the relay valve when the manual valve is in one position, and a second conduit for communicating the oil pump with the relay valve through the manual valve when the manual valve is in another position, the relay valve having a spring urging its movable valve, the relay valve supplying a reduced hydraulic pressure to the oil pressure chamber in the pressure regulator valve when the manual valve is in one position which reduced pressure is equal to the hydraulic pressure supplied from the first conduit minus the pressure corresponding to the force of the spring, while when the manual valve is in another position the relay valve supplying the hydraulic pressure supplied from the second conduit and being subjected to no regulation to the oil pressure chamber in the pressure regulator valve, the hydraulic pressure control operation of the pressure regulator valve being varied in response to the positions of the manual valve.

According to another aspect of the present invention, the hydraulic pressure control device further includes a second oil pressure chamber formed in the pressure regulator valve for controlling the hydraulic pressure to be supplied to the hydraulic servo, an automatic shift valve activated in response to a signal representing a suitable condition for actuating the transmission by supplying to or discharging from the hydraulic servo the hydraulic pressure thereby establishing the low-speed forward-drive ratio and the high-speed forward-drive ratio, a third conduit for communicating the conduit for supplying the hydraulic pressure from the automatic shift valve to the hydraulic servo with the second oil pressure chamber in the pressure regulator valve and the control operation of the pressure regulator valve being varied in response to the position of the manual valve and the actuation of the automatic shift valve.

BRIEF DESCRIPTION OF THE DRAWING

FIG. 5, the second in the II range, FIG. 6, the first in the L range, and FIG. 7, the second in the L range;

DESCRIPTION OF THE PREFERRED EMBODIMENT

Figure 1:
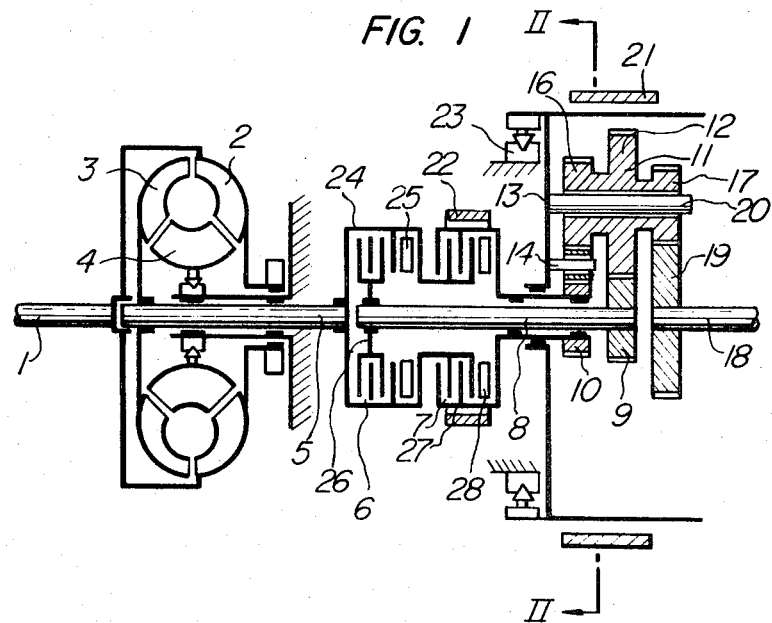
FIG. 1 is a schematic diagram illustrating one example of an automatic transmission to which is applied the present invention.

The present invention will be described as being applied to a three-forward-speed and one-reverse-speed automatic transmission, which, as viewed from FIG. 1, consists of a torque-converter unit consisting of a pump 2 directly coupled to an engine shaft 1, a turbine 3 directly coupled to a turbine shaft 5 and a stator 4, and a planetary gearing together with clutches 6 and 7 and brake bands 21 and 22 automatically controlled by a hydraulic servomechanism in a manner well known in the art.

The turbine shaft 5 coupled to the turbine 3 is the input shaft of the planetary gearing and is splined to a drum 24. The front clutch 6 disposed in the drum 24 is engaged or disengaged through a back spring (not shown) by a piston 25 actuated under the hydraulic pressure. The outer periphery of the drive plate of the front clutch 6 is splined to the drum 24 while the inner periphery of the clutch disk is splined to a hub 26 which in turn is splined to an intermediate shaft 8. The clutch disk of the rear clutch 7 is fixed to the front clutch drum 24 while the drive plate of the rear clutch 7 is splined to the rear clutch drum 27 and is adapted to be actuated by a hydraulically actuated piston 28.

Figure 2:
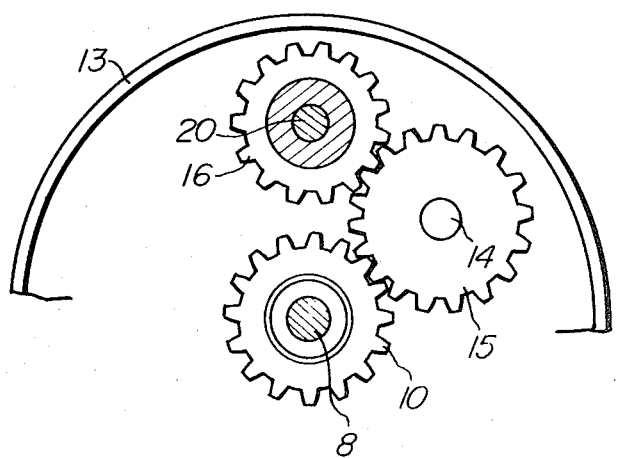
FIG. 2 is a fragmentary sectional view taken along the line A—A in FIG. 1 for illustration of an idler gear not shown in the figure.

An input sun gear is carried by the rear end of the intermediate shaft remote from the hub 26, and a reverse sun gear 10 is carried by the rear clutch drum 27. The input sun gear 9 is in mesh with the pinions 12 of a plurality of compound planet pinions 11 while the reverse sun gear 10 is in mesh with an idler gear 15 (See FIG. 2) slidably carried by a pin 14 which in turn is fixed to a carrier 13. The idler gear 15 is in mesh with the pinion 16 of the compound planet pinion 11. The pinion 17 of the compound planet pinion 11 is in mesh with a gear 19 carried by an output shaft 18 of the automatic transmission. The compound planet pinions 11 consisting of the pinions 16, 12 and 17 is carried by the pinion pin 20 which is fixed to the carrier 13.

The carrier 13 has the rear brake band 21 which is applied or released so as to lock or unlock the carrier 13. Similarly the rear clutch drum 27 has the front brake band 22 for locking or unlocking the rear clutch drum 27 and thus the reverse sun gear 10.

A one-way brake 23 in the carrier 13 has the same function as that of the rear brake band 21 in the low range as will be described in more detail hereinafter.

Next the mode of operation will be described in brief.

First: Both of the front clutch 6 and the rear brake band 21 are actuated. (However when the power is transmitted from the engine, the one-way brake 23 is actuated thus resulting in the same effect as that of the rear brake band even when the latter is not actuated, so that when the one-way brake 23 is provided, it is not required to actuate the rear brake band 21. However, the power from the output shaft is not transmitted). In this case, the rotation of the turbine shaft 5 is transmitted to the input sun gear 9 through the front clutch 6. The carrier 13 is locked by the rear brake band 21 so that the input rotation is transmitted to the gear 19 carried by the output shaft through the pinions 12 and 17 from the sun gear 9. In this case, the rotational speed is reduced.

Second: The front clutch 6 is kept actuated while the rear band brake 21 is released, but the front brake band 22 is actuated. The turbine shaft 5 rotates in unison with the input sun gear 9 while the clutch drum 27 and hence the reverse sun gear 10 are locked by the front brake band 22. The rotation of the turbine shaft 5 may be directly transmitted to the input sun gear 9 which in turn rotates the compound planet pinions 11 in the direction (counterclockwise direction) opposite to the direction (clockwise direction) of the rotation of the turbine shaft 5. Therefore the gear 15 tends to rotate in the clockwise direction through the pinion 16, but since the gear 10 in mesh with the idler gear 15 is locked the pinion pin 14 rotates in the clockwise direction. This rotation is additionally transmitted to the input shaft gear 19 and to the input gear 9 which is coupled to the turbine shaft 5. The number of teeth of the pinion 12 is greater than that of the pinion 17, so that the rotational speed of the intermediate shaft 8 becomes higher than that of the output shaft 18. In other words, the rotational speed is reduced.

Third: This is obtained by actuating both of the front and rear clutches. Input sun gear 9 rotates in unison with the reverse sun gear 10 so that the whole planetary gear set is rotated. In consequence, the rotational speed of the output shaft 18 is equal to that of the turbine shaft 5.

Reverse: The rear clutch 7 and the rear brake band 21 are actuated. The carrier 13, thus the pinions 14 and 20 are locked so that the rotation of the turbine shaft 5 is transmitted to the reverse sun gear 10 through the rear clutch 7 and is further transmitted to the gear 19 of the output shaft 18 through the pinions 15, 16 and 17, thereby reversing the output shaft 18.

So far the transmission to which is applied the present invention has been described and next the hydraulic circuit to which is applied the present invention will be described with reference to FIGS. 3–7. In general the hydraulic pressure circuit comprises a hydraulic pressure source 100 and an actuating circuit 110 comprising a manual shift valve (manual shift range setting valve) 120, an 1–2 shift device 130, a 2–3 shift device 135, a check valve 140 and hydraulic lines or conduits. The hydraulic pressure source 100 comprises an oil pump 101, an oil strainer 102, a pressure adjustment valve 80, a relay valve 90, a check valve 103 and an oil cooler 104. The hydraulic pressure source 100 also serves to supply oil to the torque-converter, lubricant to the gear and pinions and oil under pressure to the actuating circuit 110.

Figure 3:
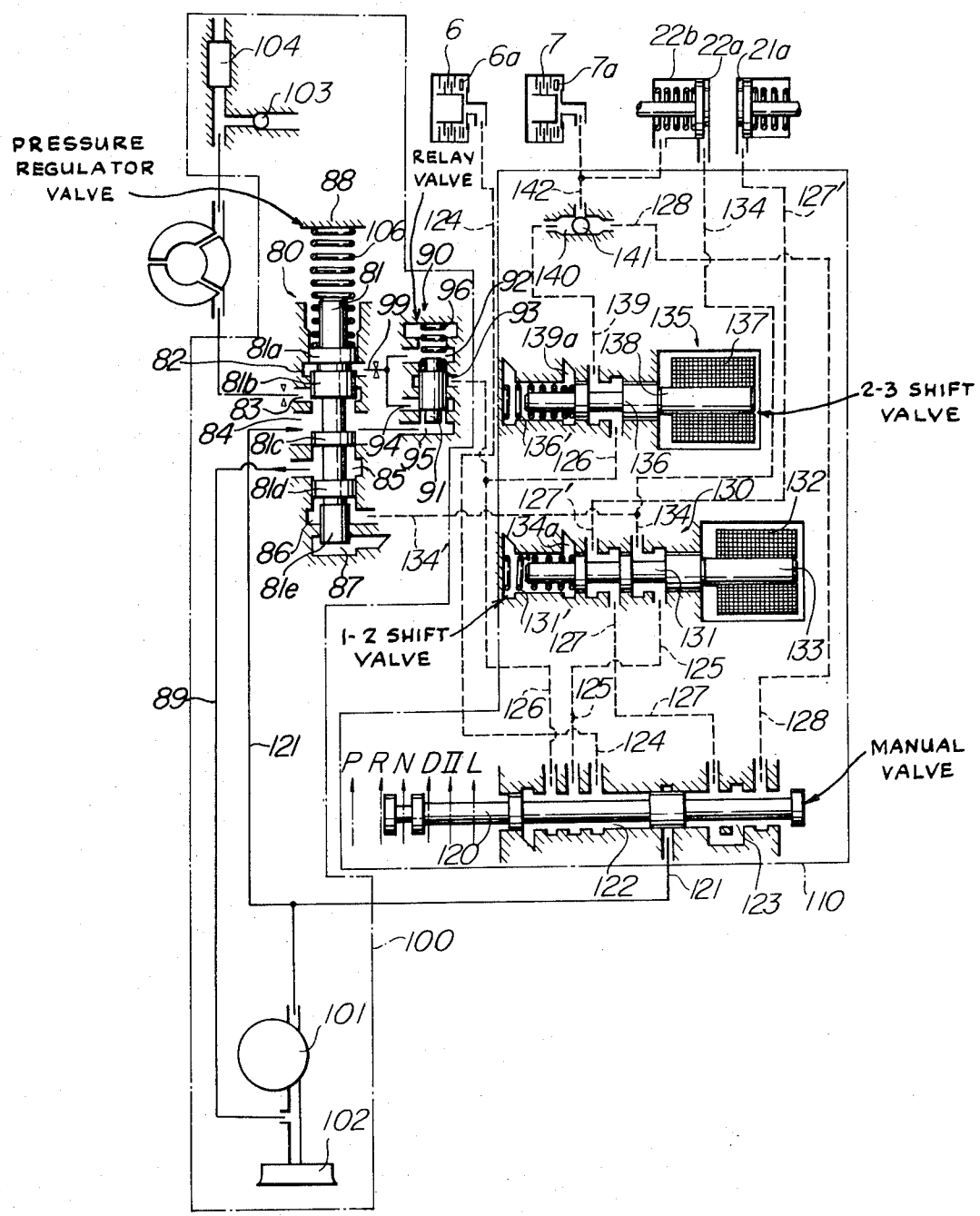
FIGS. 3 – 7 are diagrams of the hydraulic circuit according to the present invention in various positions, FIG. 3 illustrating the N range, FIG. 4, the third in the D range.
Figure 4:
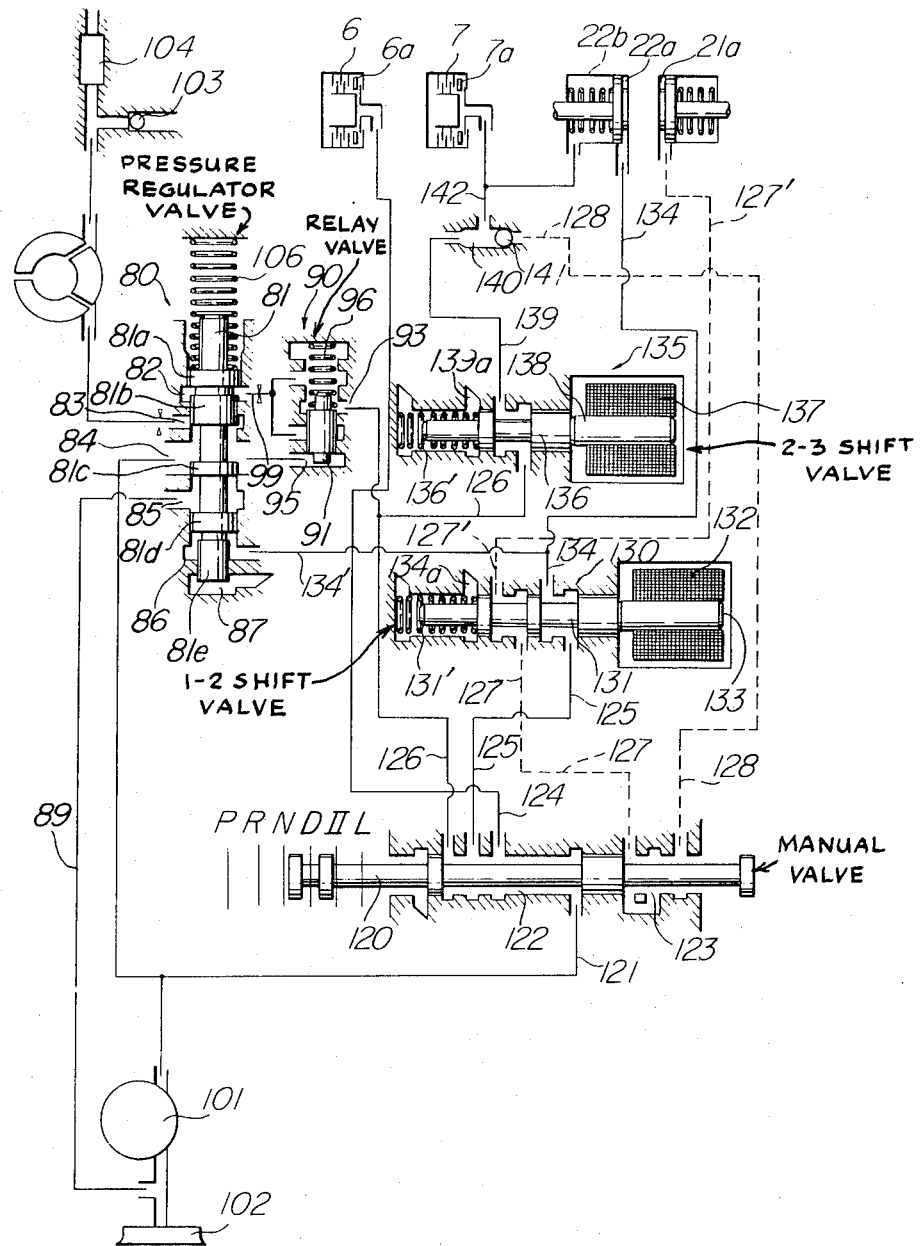
Figure 5:
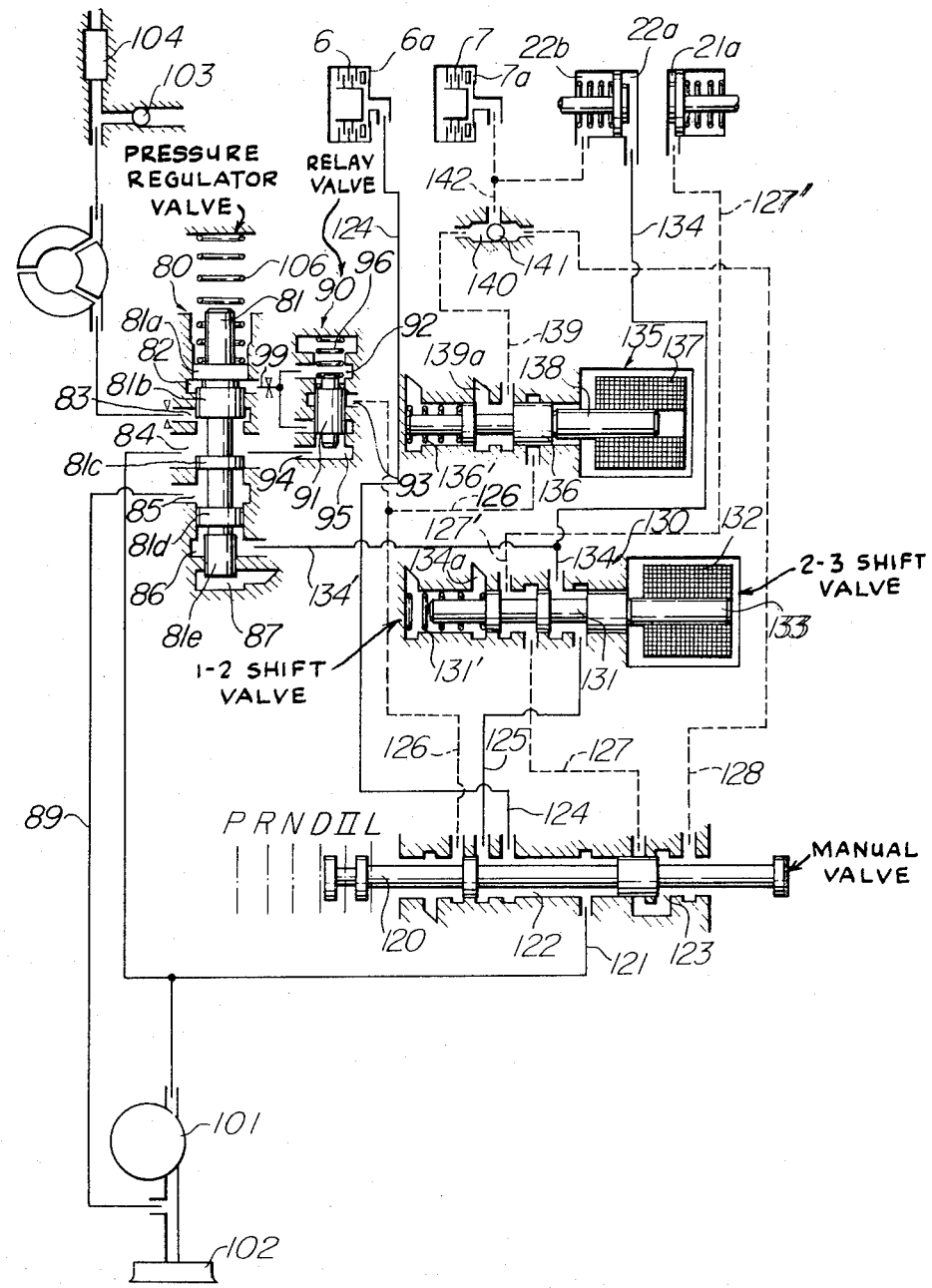
Figure 6:
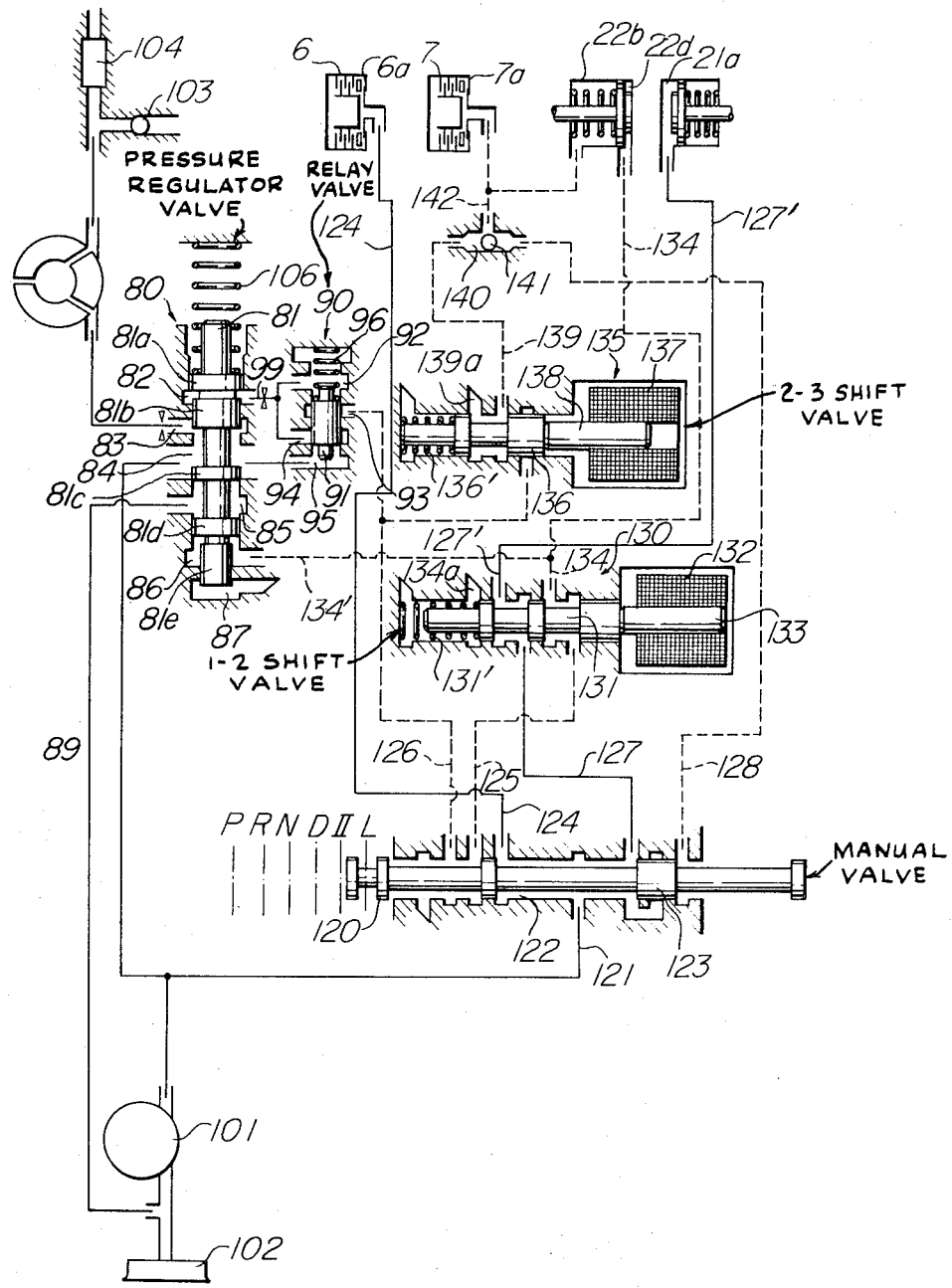
Figure 7:
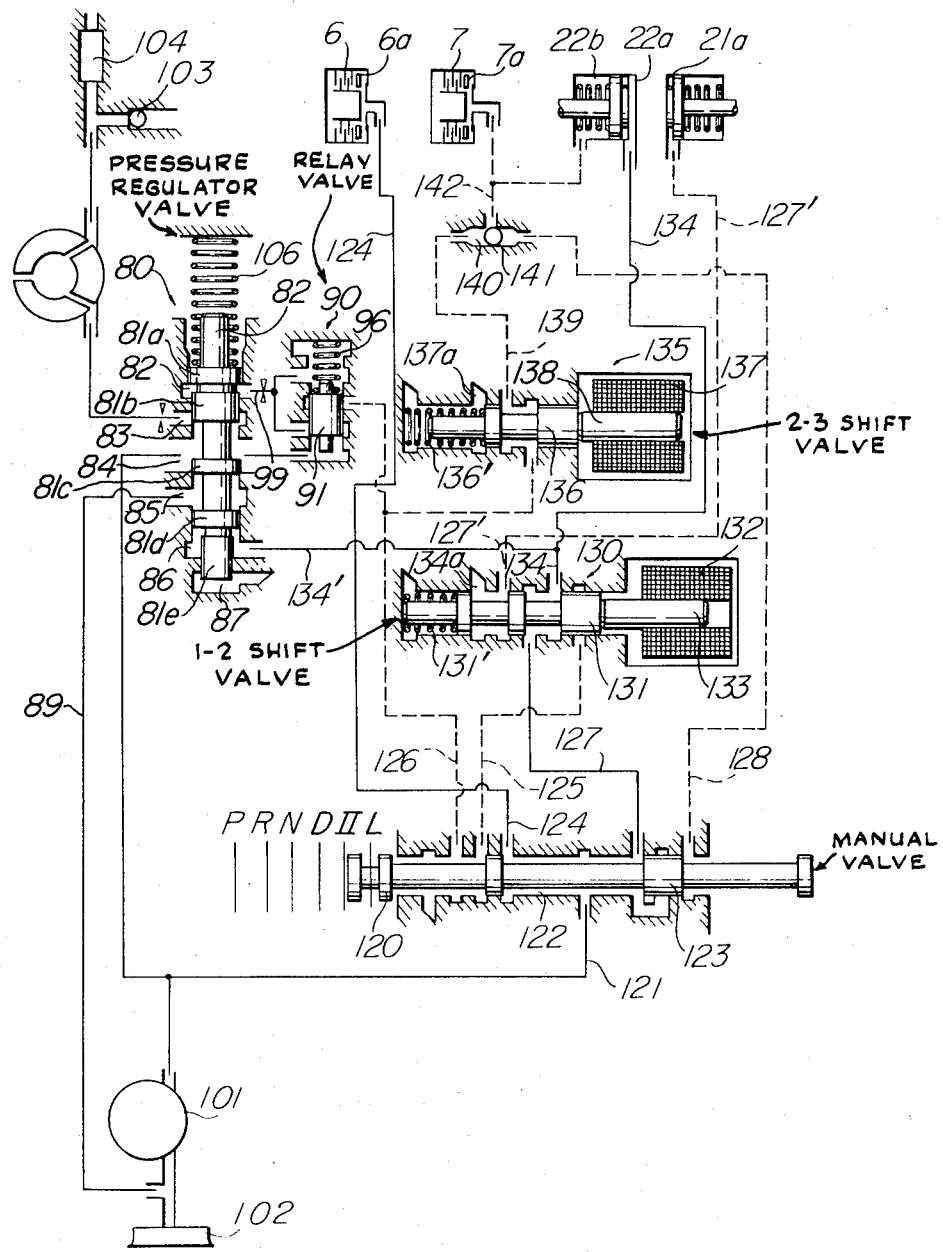

The manual valve 120 is coupled to a shift lever (not shown) disposed near the driver's seat, and has six positions, P, R, N, D, II and L. When the manual valve 120 is in the N position as shown in FIG. 3, the conduit 121 is closed while the valve chambers 122 and 123 are opened. When the manual valve 120 is in the D position as shown in FIG. 4, the hydraulic conduit 121 is made in communication with the hydraulic conduits 124, 125 and 126. The conduit 124 is directly coupled to a front clutch servo chamber 6a; the conduit 125, to the actuating side 22a of the front brake band through the 1-2 shift device 130; and the conduit 126, to a rear clutch servo chamber 7a and to a front brake releasing side 22b through the 2-3 shift device 135 and the check valve 140.

The 1-2 shift device 130 comprises a valve 131 and a solenoid 132 and one end of the valve 131 (the right end in the figures) is made in contact with a moving core 133 of the solenoid 132. When the solenoid is not energized the valve 131 is positioned in the right position under the force of a spring 131' which contacts the valve 131 at the other end (left end) thereof so that the conduits 125 and 134 are communicated with each other, whereby the front brake band 22 is applied. When the solenoid 132 is energized, the moving core 133 causes the valve 131 to move to the left position so that the conduits 125 and 134 are disconnected. The conduits 134 and 127 are intercommunicated to drain the conduit 134 so that the front brake band 22 is released.

Similarly the 2-3 shift device 135 comprises a valve 136 and a solenoid 137. One end (the right end in the figures) of the valve 136 is made in contact with the moving core 138 of the solenoid 137. When the solenoid is de-energized, the valve 136 is positioned to the right under the force of the spring 136' at the other (left) end of the valve 136 so that the conduits 126 and 139 are intercommunicated, whereby the check ball 141 of the check valve 140 is pressed against the conduit 128, thereby closing it. The conduits 139 and 142 are intercommunicated so that the rear clutch 7 is actuated while the front brake band 22 is released. When the solenoid 137 is energized, the valve 136 is moved to the left so that the conduits 126 and 139 are disconnected from each other while the conduit 139 is communicated with the discharge port 139a. Consequently the pressure in the hydraulic conduit 139 is released.

First in D range: Both of the solenoids 132 and 137 are energized and only the front clutch 6 is actuated by the line pressure in the conduit 124 of the manual valve 120. When driven from the engine side, the one-way brake 23 is engaged to lock the carrier 13, whereby the first speed is attained. In this case, the power is not transmitted from the output shaft and the free wheeling condition is maintained.

Second in D range: The line pressure in the conduit 124 to the front clutch 6 is maintained while the solenoid 132 of the 1-2 shift device is de-energized so that the conduits 125 and 134 are communicated with each other, thereby actuating the front brake band 22. Thus the second speed is attained.

Third in D range: (See FIG. 4) The solenoid 137 of the 2-3 shift device is also de-energized so that the conduits 126 and 139 are communicated with each other thereby actuating the rear clutch 7 while releasing the front brake band 22. Thus, the third speed is attained.

II range: (See FIG. 5) The line pressure in the conduit 126 to the 2-3 shift valve 135 is released while only the conduits 124 and 125 are communicated with the hydraulic pressure source. In this case, irrespective of the energization or de-energization of the 2-3 shift solenoid 137, the third speed will not be attained. Depending upon the energization or de-energization of the 1-2 shift solenoid 132, the first or second speed is attained.

L range: The line pressure in the conduits 125 and 126 is released while the conduits 124 and 127 are communicated with the hydraulic pressure source. In this case, the valve 131 is positioned to the right when the solenoid 132 is de-energized (See FIG. 6) so that the conduits 127 and 127' are communicated with each other, whereby the rear brake band 21 is applied. In consequence both of the front clutch 6 and the rear brake band 21 are actuated so that the first speed is attained. In this case, this first speed is different from that in the D range in that the rear brake band 21 is applied, so that the power from the output shaft may be transmitted, whereby the "engine brake" or hill braking is applied. When the solenoid 132 is energized (see FIG. 7), the valve 131 is moved to the left so that the conduits 127 and 134 are intercommunicated while the conduit 127' is communicated with the discharge port 134a. In consequence the front brake band 22 is applied while the rear brake band 21 is released, whereby the second speed is attained.

R range: The line pressure in the conduits 124, 125 and 126 is released while the conduits 127 and 128 are communicated with the hydraulic pressure source so that the rear clutch 7 and the rear brake band 21 are actuated. Thus, the reverse is attained.

So far the hydraulic pressure circuit to which is applied the present invention has been described and next the pressure regulator valve 80 and the relay valve 90 to which is directed the present invention will be described hereinafter.

The pressure regulator valve 80 has a function of regulating the line pressure PL to be applied to the servos of the front and rear clutches 6 and 7 and front and rear brake bands 21 and 22. First the construction of the pressure regulator valve 80 will be described. The valve spool 81 of the valve 80 has five lands 81a, 81b, 81c, 81d and 81e in the order named from the upper end to the lower end as shown in FIG. 3. The valve 80 is provided with six oil pressure chambers 82, 83, 84, 85, 86 and 87. The oil pressure chamber 82 is communicated with the conduit 99 from the relay valve 90 to be described in more detail hereinafter. The diameter of the land 81a is larger than that of the land 81b so that the line pressure forced into the oil pressure chamber 82 exerts the upward force upon the spool 81 because of the land diameter difference. The oil pressure chamber 83 is communicated with the circulating conduit to the torque-converter while the oil pressure chamber 84 is communicated with the discharge or pressure conduit 121 of the oil pump 101. Both of the oil pressure chambers 83 and 84 are intercommunicated when the land 81b is in its upper position so that the line pressure in the oil chamber 83 is transmitted to the oil pressure chamber 84. The oil pressure chamber 85 is in communication with the sump or discharge conduit 89 and is communicated with the oil pressure chamber 84 when the land 81c is in its upper position so that the oil in the oil chamber 84 may be drained into the sump (not shown) through the oil chamber 85 and the sump conduit 89. The oil pressure chamber 86 is in communication with the conduit 134 from the 1-2 shift valve 131 through the conduit 134'.

The diameter of the land 81d is larger than that of the land 81e so that the line pressure transmitted to the oil pressure chamber 86 may exert the upward force upon the spool 81. The chamber 87 is an empty space.

A coiled spring 106 is loaded between the upper surface of the land 81a and the wall 88 so that the valve spool 81 may be normally biased downwardly. The oil pressure is regulated in the pressure regulator valve 80 by the equilibrium between the downward force exerted by the coiled spring 106 and the upward force exerted to the valve spool 81 in the oil chambers 82 and 86. Thus the regulated line pressure PL exists in the conduit or line 121 and is distributed into the selected conduits in response to the actuation of or position of the manual valve 120.

Next the relay valve 90 will be described which has a function of producing the pressure difference in line pressure PL or different pressures in response to the position of the manual valve 120. As viewed from FIG. 3, the relay valve 90 is provided with four oil pressure chambers 92, 93, 94 and 95. The oil pressure chambers 92 and 94 are in communication with the oil pressure chamber 82 of the pressure regulator valve 80 through the conduit 99. The oil pressure chamber 93 is in communication with the manual valve 120 through the conduit 126, which is also communicated with the 2–3 shift valve 136 and in which exists the line pressure PL only when the manual valve is in D position. The oil pressure chamber 95 is in communication with the oil pressure chamber 84 into which is directly supplied the oil under pressure from the oil pump 101. Under the force of a coiled spring 96 which contacts, to the upper end of the spool 91 of the relay valve 90 the valve spool 91 is normally biased downwardly. When the valve spool 91 is in its lower position, the oil chambers 93 and 92 are communicated with each other so that the line pressure from the manual valve 120 through the conduit 126 is transmitted to the oil pressure chamber 82 of the pressure regulator valve 80. Upon the upward displacement of the valve spool 91, the oil pressure chamber 93 is disconnected from the oil chamber 92 while the oil pressure chambers 95 and 94 are communicated with each other so that the line pressure is transmitted to the oil chamber 82 of the pressure regulator valve 80. In this case, the weak or low line pressure is produced under the force of the spring 96 as will be described in more detail hereinafter. It is seen that depending upon the upper or lower position of the valve spool 91, the different oil or line pressure is produced and transmitted into the oil pressure chamber 82 of the pressure regulator valve 80.

The line pressure control operation by the combination of the pressure regulator valve 80 and the relay valve 90 of the types described above will be described in detail depending upon the position of the manual valve 120.

D range: (See FIG. 4)

The oil under pressure from the oil pump 101 is transmitted into the oil pressure chamber 93 through the conduits 121 and 126. The line pressure from the oil pump 101 passing through the oil pressure chamber 84 of the pressure regulator valve 80 is transmitted into the oil pressure chamber 95 of the relay valve 90. The line pressure in the oil pressure chamber 93 of the relay valve 90 exerts the downward force upon the valve spool 91 together with the force of the coiled spring 96. The line pressure transmitted into the oil chamber 95 of the relay valve 90 from the pressure regulator valve 80 exerts the upward force upon the valve spool 91, but the line pressures acting upon the upper and lower ends of the spool 91 are equal so that the downward force exerted by the coiled spring 96 acts upon the valve spool 91 of the relay valve 90 to move it downwardly. In consequence, the line pressure discharged from the oil pump 101 exerts the upward force upon the valve spool 81 in the oil chamber 82 of the pressure regulator valve 80. When the solenoid 132 of the 1–2 shift valve is de-energized, the 1–2 shift valve 131 is moved to the right so that the conduit 125 is communicated with the conduit 134 so that the line pressure is transmitted to the oil pressure chamber 86 of the pressure regulator valve 80 through the conduit 134'. The line pressure in the oil pressure chamber 86 exerts the upward force on the valve spool 81 of the pressure regulator valve 80. The line pressure PL generated in the pressure regulator valve 80 is a constant low line pressure PLD determined by the equilibrium between the force of the coiled spring 106 acting upon the upper end of the valve spool 81 of the regulator valve 80 and the oil pressure acting upon the area difference between the lands 81a and 81e of the valve spool 81 in the oil pressure chambers 82 and 86.

Figure 8:
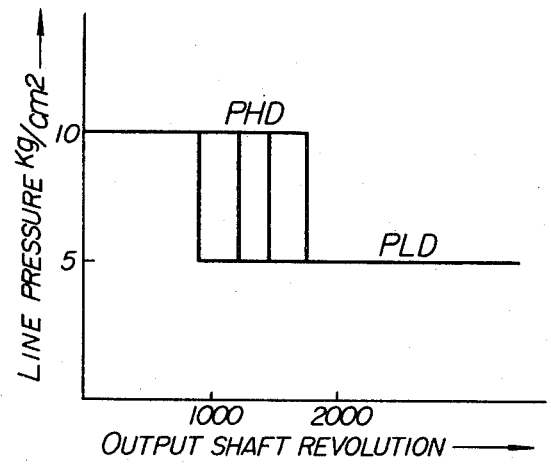
FIG. 8 is a graph illustrating the line pressure variation relative to the rotational speed of the output shaft in the D range, the line pressure being controlled by the hydraulic circuit.

When the solenoid 132 of the 1–2 shift valve 131 is energized, the latter is moved to the left position so that the conduit 134 is communicated with the conduit 127 and drained. The oil pressure chamber 86 of the pressure regulator valve 80 is also released so that the line pressure produced in the pressure regulator valve 80 is determined by the equilibrium between the force of the coiled spring 106 and the oil pressure acting upon area difference between the lands 81a and 81b of the valve spool 81 in the oil pressure chamber 82. In this case the line pressure is a constant high pressure PHD. In summary in the D range of the manual valve 120, the pressure regulator valve 80 produces the relatively high hydraulic pressure or line pressure PHD when the 1–2 shift valve is in its left position (the first speed position) and the relative low hydraulic pressure or line pressure PLD when the 1–2 shift valve is in its right position (second and third speed position). The hydraulic or line pressure characteristic curves in the D range are illustrated in FIG. 8, from which it is seen that when the shift through the speeds from first to second takes places as the rotational speed of the output shaft (that is the speed of the car) is increased, the relatively high hydraulic pressure PHD is stepped down to the low constant line pressure PLD. The so-called 1–2 shift point where the first speed is shifted to the second speed is varied in response to the engine-torque-response signal so that the step-down points of the hydraulic or line pressure are varied as shown in FIG. 8 in response to the engine-torque-response signals.

II or L range:

The hydraulic pressure in the conduit 126 from the manual valve 120 is released so that in the oil pressure chamber 82 of the pressure regulator valve 80 acts the pressure PMO (to be referred to as "the reducing pressure" hereinafter) which is equal to the hydraulic pressure supplied from the oil pump 101 minus the hydraulic pressure corresponding to the force of the coiled spring 96. More specifically when the hydraulic pressure in the upper oil pressure chamber 93 of the relay valve 90 is exhausted, the valve spool 91 is caused to move upwardly because of the hydraulic pressure in the oil chamber 95 which is normally supplied from the oil pump 101, so that the oil chambers 95 and 94 are intercommunicated, thereby transmitting the hydraulic pressure to the upper oil chamber 92 of the relay valve 90. The hydraulic pressure transmitted into the oil pressure chamber 92 exerts downward force upon the valve spool 91 together with the spring 96. This downward force is made in equilibrium with the upward hydraulic pressure acting upon the valve spool 91 in the lower oil chamber 95. As described above, the downward force is made up of the hydraulic pressure and the force of the coiled spring 96 so that the downwardly acting hydraulic pressure may be reduced by a degree corresponding to the force of the spring 96. That is, the hydraulic pressure in the oil chamber 92 may be lower than that in the oil pressure chamber 95 by a pressure corresponding to the force of the coiled spring 96. This hydraulic pressure is transmitted into the oil chamber 82 of the pressure regulator valve 80. In this case, the oil pressure chamber 93 serves as the sump conduit, the oil under pressure is drained into the oil chamber 93 from the oil chamber 92 in the equilibrium action described above, thereby accomplishing the control action.

The oil under pressure is supplied into the conduit 125 when the manual valve 120 is in II position and into the conduit 127 when the manual valve 120 is in L position so that depending upon the positions of the 1–2 shift valve 131, the hydraulic pressure acts or does not act in the oil chamber 86 of the pressure regulator valve 80 through the conduit 134'. When the hydraulic pressure is transmitted into the oil chamber 86, the hydraulic or line pressure produced by the pressure regulator valve 80 becomes a lower constant hydraulic pressure PLL which is determined by the force of the coiled spring 106, the reducing pressure PMO in the oil chamber 82 and the hydraulic pressure in the oil chamber 86. When no hydraulic pressure is transmitted into the oil chamber 86, the hydraulic or line pressure produced by the pressure regulator valve 80 is a higher constant hydraulic pressure PHL that is determined by the force of the coiled spring 106 and the reducing pressure PMO in the oil chamber 82.

P, R and N positions:

In this case, the oil pressure chamber 86 of the pressure regulator valve 80 is constantly drained so that the hydraulic or line pressure produced by the pressure regulator valve 80 is the high constant hydraulic pressure PHL.

Figure 9:
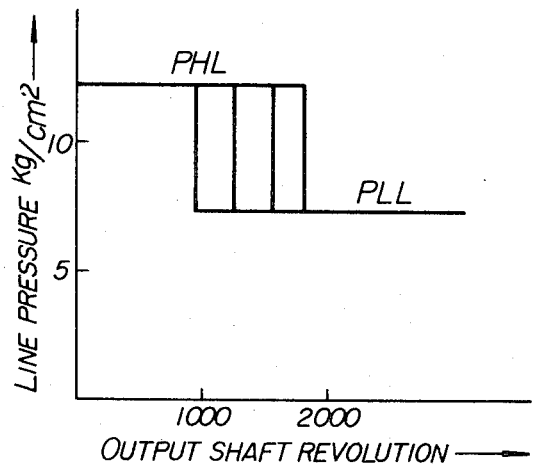
FIG. 9 is a graph illustrating the line pressure variation relative to the rotational speed of the output shaft in the II or L range, the line pressure being controlled by the hydraulic circuit.

In the II or L position of the manual valve 120, the constant high hydraulic pressure PHL is produced in the first speed while the relatively low constant pressure PLL, in the second speed. In P, R and N positions, the constant high hydraulic pressure PHL is generated. The hydraulic pressure characteristic curves depending upon the positions of the manual valve 120 are illustrated in FIG. 9, which is similar to FIG. 8. From both of FIGS. 8 and 9, the control hydraulic pressure is stepped down at the shift through the speeds from first to second. The magnitude of the control hydraulic pressure in FIG. 9 are higher than those in FIG. 8 and the hydraulic pressure difference is produced between the D position and other positions for example II or L position of the manual valve 120. The pressure difference is produced because the hydraulic pressure in the oil chamber 82 of the pressure regulator valve 80 is different depending upon the position of the manual valve. This will be described in more detail hereinafter. In the D position of the manual valve 120, the hydraulic pressure as-discharged-from-the oil pump 101 is supplied into the oil chamber 82 of the pressure regulator valve 80 so as to oppose to the force of the spring 106. However, in the position for example II or L of the manual valve 120 except the D position, the hydraulic pressure whose magnitude is reduced by a pressure corresponding to the force of the coiled spring 196 by the relay valve 90 is supplied so as to oppose the force of the spring 106. The hydraulic pressure supplied into the oil chamber 82 in II or L position is lower than that in the D position so that the pressure difference corresponding to that between two positions is shown in the graph of FIG. 9.

In the present invention, depending upon the position of the manual valve the hydraulic or line pressure PL having a different magnitude may be derived and the hydraulic pressure diagram in which the step-down occurs by the shift through the speeds from first to second, is also obtained. Therefore, when the car speed is low, the line pressure determined in consideration of the torque increase in the torque-converter may be supplied to the hydraulic servo chambers of the clutches and brake bands, thereby producing the sufficient engaging or locking forces. On the other hand, when the car speed is increased, the torque-converter is held in coupling or almost coupling position so that no torque increase is produced. In this case, the low constant line pressure is supplied to the hydraulic servos so as to prevent the power loss due to the oil pump loss or the like. Especially the control hydraulic pressure is varied by the relay valve 90 in the D and other ranges so that the sufficient and suitable hydraulic pressures may be applied to the rear clutch 7 and to the rear brake band 21 when reversed. To change the traveling condition, when the car is started at the second speed in the II range, the hydraulic pressure slightly higher than that at the second speed in the D range is supplied so as to increase the torque in the low-speed range. In addition, as the means for varying the control hydraulic pressure depending upon the traveling conditions, the shift valves for shift control are used so that the valve means for varying the hydraulic pressure may be eliminated, thus resulting in the simple hydraulic circuit.

In the preferred embodiment described hereinabove, the conduit 134 from the 1–2 shift valve to the servo is communicated with the oil pressure chamber 86 of the pressure regulator valve 80 so that the line pressure may be stepped down simultaneously when the second is selected. However, it is to be understood that the conduit 139 from the 2–3 shift valve to the servo may be communicated with the oil chamber 86 of the pressure regulator valve 80 so that the line pressure may be stepped down simultaneously when the third is selected.

As described hereinabove, 1–2 shift valve 131 and the 2–3 shift valve 136 are actuated in order to vary the pressure regulating operation of the pressure regulator valve 80, thereby accomplishing the automatic transmission. This is done whether the solenoids 132 and/or 137 are energized or de-energized.

The shift control due to the energization and de-energization of the solenoids 132 and/or 137 may be effected depending upon the traveling conditions.

Various shift control systems have been proposed, for example, in U.S. Pat. Nos. 3,068,715 and 3,019,666. However, another novel shift control system will be developed, but it is to be understood that the present invention may also be applied to a newly developed shift control system within the scope of this invention.

The description has been so far directed to the three-forward-speeds and one-reverse-speed automatic transmission, but various variations and modifications may be effected without departing from the scope of the present invention if the state of the art of the present invention is sufficiently understood. This is also clear from the fact that the present invention has many technical features.

What is claimed is:

1. In a hydraulic pressure control device for use in an automatic transmission of the type including a fluid torque-converter or fluid coupling and a transmission provided with hydraulic servo means for brake bands, clutches and the like which carry out an automatic speed change: an oil pump for generating the hydraulic pressure to be supplied to said hydraulic servo means, a pressure regulator valve for controlling the hydraulic pressure to be applied to said hydraulic servo, said pressure regulator valve having an oil pressure chamber formed therein for controlling said hydraulic pressure, a manual valve having at least two positions, a relay valve for supplying a required hydraulic pressure to said oil pressure chamber in said pressure regulator valve, a first conduit for communicating said oil pump with said relay valve when said manual valve is in one position, and a second conduit for communicating said oil pump with said relay valve through said manual valve when said manual valve is in another position, said relay valve having a movable valve element and a spring urging said valve element, said relay valve supplying a reduced hydraulic pressure to said oil pressure chamber in said pressure regulator valve when said manual valve is in one position which reduced pressure is equal to the hydraulic pressure supplied from said first conduit minus the pressure corresponding to the force of said spring, while when said manual valve is in another position said relay valve supplying the hydraulic pressure supplied from said second conduit and being subjected to no regulation to said oil pressure chamber in said pressure regulator valve, and the hydraulic pressure control operation of said pressure regulator valve being varied in response to the positions of said manual valve.

2. A hydraulic pressure control device for use in an automatic transmission as defined in claim 1 characterized by further including a second oil pressure chamber formed in said pressure regulator valve for controlling the hydraulic pressure to be supplied to said hydraulic servo means, an electrically operated automatic shift valve activated in response to a transmission actuation signal for selectively supplying to and discharging from said hydraulic servo means the hydraulic pressure thereby establishing a low-speed forward-drive ratio and a high-speed forward-drive ratio, and a third conduit for communicating the conduit for supplying the hydraulic pressure from said automatic shift valve to said hydraulic servo means with said second oil pressure chamber in said pressure regulator valve, the control operation of said pressure regulator valve being varied in response to the position of said manual valve and the actuation of said automatic shift valve.

* * * * *